A. R. PRIBIL.
CONNECTING ROD.
APPLICATION FILED APR. 11, 1919.

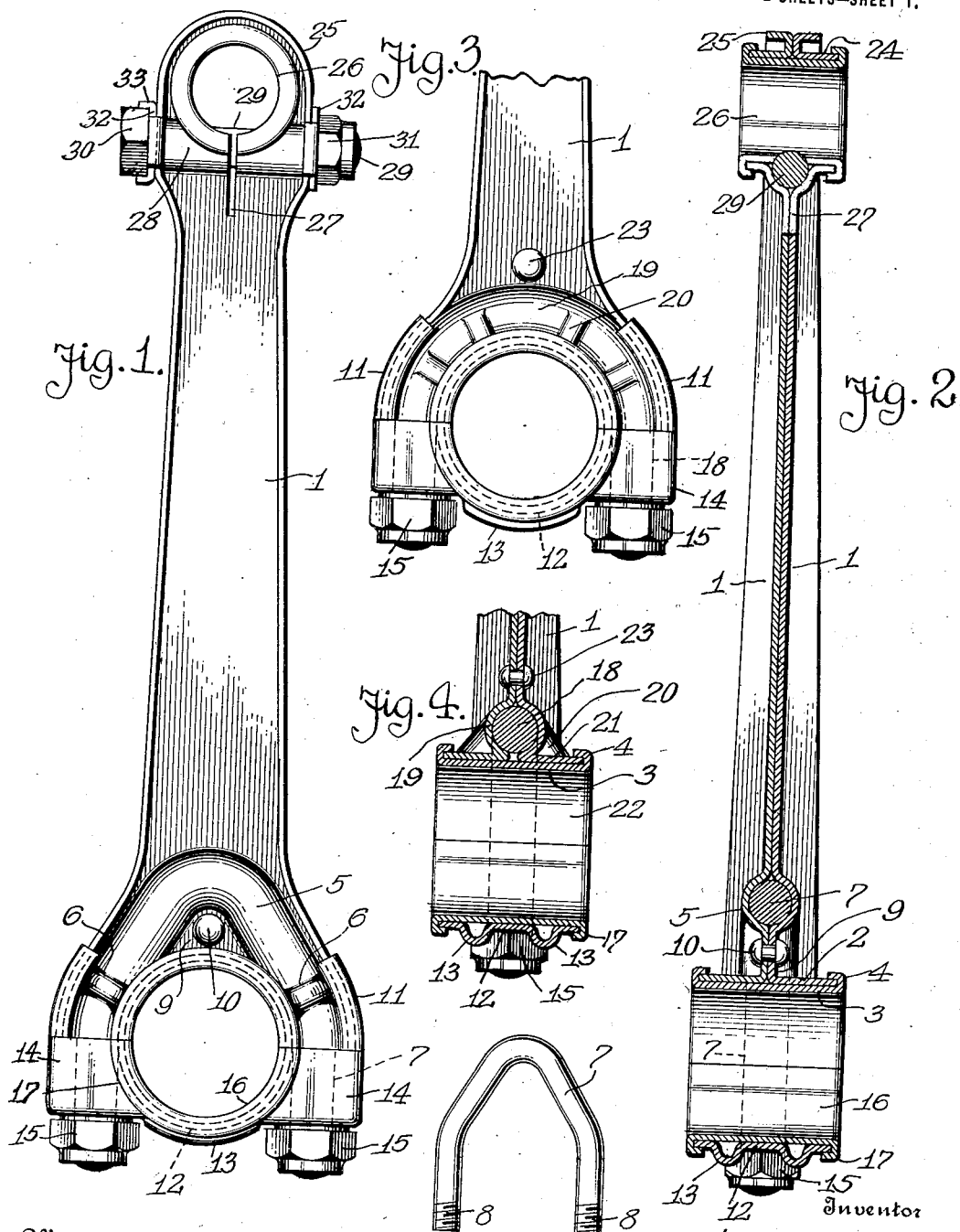

1,355,261.

Patented Oct. 12, 1920.
2 SHEETS—SHEET 2.

Witness
Chas. W. Stauffiger
Karl H. Butler

Inventor
Alexis R. Pribil,
By
Attorneys

UNITED STATES PATENT OFFICE.

ALEXIS R. PRIBIL, OF SAGINAW, MICHIGAN.

CONNECTING-ROD.

1,355,261.  Specification of Letters Patent.  Patented Oct. 12, 1920.

Application filed April 11, 1919. Serial No. 289,214.

*To all whom it may concern:*

Be it known that I, ALEXIS R. PRIBIL, a citizen of the United States of America, residing at Saginaw, in the county of Saginaw and State of Michigan, have invented certain new and useful Improvements in Connecting-Rods, of which the following is a specification, reference being had therein to the accompanying drawings.

In my pending applications filed Dec. 26, 1916, Serial No. 138,955 and July 12, 1917, Serial No. 180,052, there are disclosed connecting rods constructed from pressed steel parts, and in the last mentioned application I lay great stress on a rod made of twin halves or parts connected to provide a crank shaft bearing with a U bolt having its middle portion secured between the halves or parts of the rod. When making such rod, I found that the U-bolts often required machining and could not be positively anchored between the halves or parts of the rod as firmly as might be required in some structures, and I furthermore found that certain portions of the rod heretofore considered more or less weak, could be materially strengthened or reinforced by using a cap-holding bolt of different shape than a U-bolt, and while this invention is directed particularly to the driven end of a connecting rod, yet during the practice of my invention I have found that certain improvement could be made in connection with the drive end of the rod.

First, considering the driven end of the rod which affords a crank shaft bearing having a detachable cap, I substitute what may be termed an inverted V-shaped bolt for the U-bolt previously referred to, and in employing an inverted V-shaped bolt I utilize the novel shape of the same and inherent properties for materially strengthening and reinforcing the crank shaft bearing of the rod. The shape of an inverted V-shaped bolt necessarily provides angularly disposed legs and when this bolt is secured in the plane of the junction of the halves or parts of the rod, the legs diverging from the head or apex of the bolt form a substantial truss or bridge member over the upper half of the crank shaft bearing, with the legs providing sufficient clearance for a connection between the halves or parts of the rod approximately central of the head of the bolt, thus permitting of the material of the rod to snugly embrace the head and legs of the bolt. Furthermore, the diverging legs of the bolt stiffen and reinforce those portions of the rod, at the juncture of the rod shanks with the crank shaft bearing that are liable to crack and break when the rod is subjected to excessive stresses and strains. Besides providing a better rod construction at the crank shaft bearing the use of an inverted V-shaped bolt, in contradistinction to a U-bolt, facilitates the manufacture of the rod by permitting of dies being readily constructed at a reduced expense.

My invention also includes certain other improvements and these, together with the mechanical construction entering into my invention, will be hereinafter described and then claimed.

Reference will now be had to the drawings, wherein—

Figure 1 is a side elevation of the preferred form of connecting rod;

Fig. 2 is a vertical longitudinal sectional view of the same;

Fig. 3 is a side elevation of a driven end of a modified form of connecting rod;

Fig. 4 is a vertical sectional view of the same;

Fig. 5 is a side elevation of a detached inverted V-shaped bolt;

Figure 10:
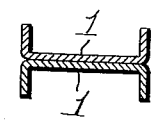
Fig. 10 is a horizontal sectional view of the shank of the connecting rod.
Figure 11:
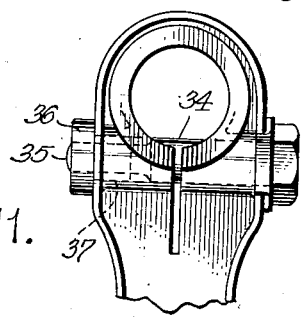
Fig. 11 is a side elevation of the drive end of a connecting rod illustrating a modified form of connection.

The connecting rod comprises a shank formed of two tapering channel members 1 disposed back to back and suitably connected together, so that the shank of the connecting rod will have a cross section similar to an I beam, best shown in Fig. 10 of the drawing. It is along the outer meeting edges of the members 1 that said members may be advantageously welded together. The small end of the shank terminates in a drive end construction and the large end of the shank terminates in a driven end construction or crank shaft bearing, and first considering the driven end of the rod, reference will be had to Figs. 1, 2, 5 and 6.

The members 1 have the lower ends thereof enlarged and provided with pressed-out alining semi-cylindrical sleeves 2 for a semi-cylindrical bushing 3 which has its ends flanged and bent on to the ends of the sleeves 2, as at 4, thereby adding rigidity to said sleeves.

The material between the sleeves 2 and the flanged side edges of the members 1 is pressed out to provide confronting or communicating inverted V-shaped pockets 5 having the ends thereof open in a plane with the lower longitudinal edges of the semi-cylindrical sleeves 2, and said pockets, contiguous to the open ends thereof, are provided with reinforcing ribs 6 which add rigidity to the leg portions of said pockets.

Mounted in the pockets 5 is the middle and apex portion of an inverted V-shaped bolt 7 which has its threaded ends 8 protruding from the open ends of the pockets 5, said inverted V-shaped bolt providing diverging legs with the threaded ends 8 of the bolt disposed in parallelism so that a cap may be readily placed on the ends of the inverted V-shaped bolt. With the pockets 5 pressed out to receive and snugly embrace the bolt 7, there is a place centrally of the head of the bolt or in the apex thereof where the members 1 contact, and this place has been designated 9 and a rivet 10 or other fastening means is employed to connect the members 1 so that there is no danger of said members separating to liberate the inverted V-shaped bolt, and with said members connected at this place the walls of the pockets 5 are caused to snugly embrace the inverted V-shaped bolt, as best shown in Fig. 2. In lieu of the rivet 10 welding may be resorted to and this is accomplished without crowding the material in the apex of the bolt, consequently during the pressing or forming of the members 1 there is no danger of the material cracking due to sharp bends or shapes.

The legs of the inverted V-shaped bolt being disposed at an angle add rigidity to the rod at the junction of the shank and the crank shaft bearing and any end thrust or strains longitudinally of the rod are equally distributed at the sides of the crank shaft bearing, thus precluding any danger of the rod buckling, cracking or becoming otherwise injured where the shank of the rod joins the crank shaft bearing.

The flanges of the members 1, adjacent the open ends of the pocket 5, are braced and connected by binding members 11 and these members materially stiffen the web portions of the members, at the lower end of the rod, which provides an open fixed crank shaft bearing part. This open crank shaft bearing part is adapted to be closed by a cap 12 that is semi-cylindrical and pressed out to provide bottom ribs 13 and apertured bosses 14, said bosses receiving the threaded ends 8 of the inverted V-shaped bolt 7 so that nuts 15 may be screwed on the ends of the bolt to retain the cap in engagement with the body of the rod. The cap 12 is also provided with a semi-cylindrical bushing 16 having its ends flanged over the ends of the cap, as at 17, thus insuring a perfect bushing for the crank portion of an engine shaft.

Figure 6:
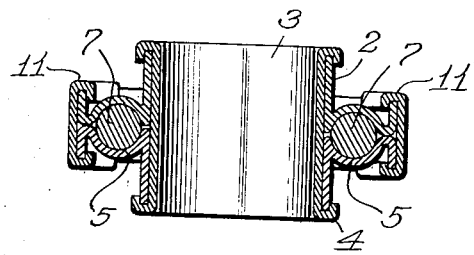
Fig. 6 is a horizontal sectional view of a portion of the connecting rod.
Figure 7:
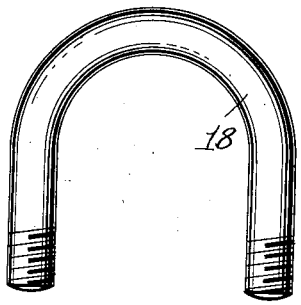
Fig. 7 is a side elevation of a U-bolt.

While considering the driven end of the connecting rod, it might be well to refer to the modification shown in Figs. 3, 4 and 7, wherein an inverted U-shape bolt 18 is mounted in pockets 19 provided therefor and said pockets reinforced by having the walls thereof provided with pressed out ribs 20 extending on to the semi-cylindrical sleeve 21 of the crank shaft bearing. The sleeves 21 support a bushing 22 similar to the bushing 3 and by reference to Fig. 4, it will be noted that the walls of the pockets 19 snugly embraces the bolt 18. With this bolt circular in cross section the walls of the pockets 19 are pressed to embrace the head of the bolt, particularly adjacent the sleeves 21, and since there is no place for connecting the members 1 within the U-bolt 18, said members are connected by a rivet 23 or other fastening means directly above the bolt. Of course this rivet, as well as the rivet 10, is employed as fastening means in addition to spot welding, riveting or other fastening between the members 1 of the connecting rod.

The cap for the U-bolt crank shaft bearing is identical with the cap 12 of the preferred form of construction, and this is also true of other structural features of said bearing which may be considered practical, yet I find that the inverted V-shaped bolt construction possesses many advantages and characteristics that materially increase the longevity of the connecting rod.

Figure 8:
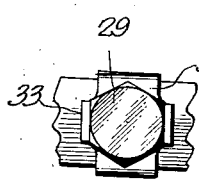
Fig. 8 is an end view of a connection for the drive end of the connecting rod.
Figure 9:
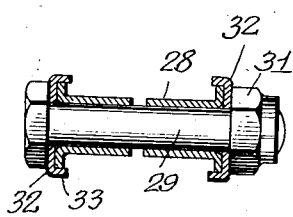
Fig. 9 is a longitudinal sectional view of the same.

Considering the drive end of the connecting rod, the members 1 are provided with pressed out sleeves 24 which aline and are surrounded by the flanges 25 of the members 1. The outer ends of the sleeves 24 are embraced by the reamed or flanged ends of a slotted bushing 26 mounted in the alining sleeves, and this bushing maintains the members 1 in contact at the drive ends of the rod shank. The members 1, at the sleeves 24, are bifurcated or slotted, as at 27 and are formed with transverse semi-cylindrical pockets 28 to receive a bolt 29, having a head 30 and a nut 31. The nut 31 may be tightened against the flanges 25 of the members 1 to contract the sleeves 24 and the bushing 26 about a piston pin, as has been brought out in some of my pending applications. One of the improvements in connection with the drive end of the connecting rod consists in providing washers 32 that are placed on the ends of the bolt 29, said washers having flanges 33 that may be bent to engage the flanges 25 of the members 1, the facets of the bolt head 30 or the facets of the nut 31. As shown in Figs. 1 and 8, the washer is prevented from turning by having its flanges engage the flanges 25 of the members 1 and with other flanges 33 of the washer engaging the bolt head 30, said bolt will be held against rotation while the nut 31 is screwed thereon. The washer associated with the nut 31 may have some of its flanges engage the flanges 25 and if so desired other flanges of the washer may lock the nut 31 against accidental rotation. However, those flanges of the washers engaging the flanges 25 of the members 1 assist in preventing said members from spreading or separating at the drive end of the connecting rod. This is best brought out in Fig. 9 showing the coöperation between the washers for this purpose.

Figure 13:
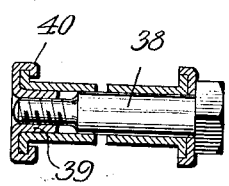
Fig. 13 is a similar view of a further modified form of connection.
Figure 12:
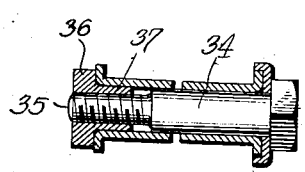
Fig. 12 is a longitudinal sectional view of the same.
Figure 14:
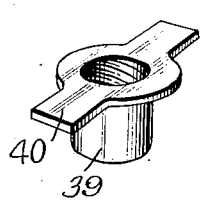
Fig. 14 is a perspective view of a detached thimble, forming part of the connection shown in Fig. 13.

Figs. 13 and 14 show how a screw bolt 34 may have a reduced screwthreaded end 35 entering a nut 36 which has a sleeve portion 37 extending into one of the pockets 28 at the drive end of the connecting rod. A similar screw bolt 38 may enter a thimble 39 extending into one of the pockets 28 and said thimble may have flanges 40 engaging the flanges 25 of the members 1 to retain the thimble in place, and such construction has been brought out in Figs. 13 and 14 of the drawings.

In view of the disclosure in my prior patents and pending applications, it is thought that the utility of the present improvements will be apparent, and while in the drawings there are illustrated the preferred embodiments of my invention, it is to be understood that the structural elements are susceptible to such variations and modifications as fall within the scope of the appended claims.

What I claim is:—

1. A connecting rod comprising two twin halves having a crank shaft bearing, and an inverted V-shaped bolt having its apex held in the plane of the junction of said halves.

2. A connecting rod comprising two twin halves providing a crank shaft bearing, an inverted V-shaped bolt between said halves, and a connection between said halves in the apex of the inverted V-shaped bolt.

3. A connecting rod comprising twin halves secured together and having a crank shaft bearing, and an inverted V-shaped bolt having its apex mounted between said halves and completely surrounded thereby.

4. A connecting rod comprising twin halves secured together and provided with semi-cylindrical sleeves affording a crank shaft bearing, an inverted V-shaped bolt having its apex secured in the plane of the junction of said halves in spaced relation to the semi-cylindrical sleeves of said halves, and a connection between said halves adjacent the sleeves thereof and below the apex of said bolt.

5. A connecting rod comprising twin halves secured together and having a crank shaft bearing, and an inverted V-shaped bolt having its legs converging in the plane of the junction of the said halves with the apex of said bolt in spaced relation to said bearing.

6. A connecting rod comprising two twin halves secured together and having a crank shaft bearing, said twin halves being pressed out to provide pockets, a bolt in the pockets of said halves, and pressed out ribs on the walls of said pockets.

7. A connecting rod comprising twin halves pressed out to provide confronting pockets, an inverted V-shaped bolt in said pockets, and a bushing maintaining said pockets in confronting relation.

8. A connecting rod comprising channel members disposed back to back, an inverted V-shaped bolt between said members, and means at the outer meeting edges of said members maintaining said members together.

In testimony whereof I affix my signature in the presence of two witnesses.

ALEXIS R. PRIBIL.

Witnesses:
O. F. BARTHEL,
KARL H. BUTLER.